United States Patent
Kamkar Parsi et al.

(10) Patent No.: US 10,403,306 B2
(45) Date of Patent: Sep. 3, 2019

(54) METHOD AND APPARATUS FOR FAST RECOGNITION OF A HEARING DEVICE USER'S OWN VOICE, AND HEARING AID

(71) Applicant: SIVANTOS PTE. LTD., Singapore (SG)

(72) Inventors: Homayoun Kamkar Parsi, Erlangen (DE); Marko Lugger, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 57 days.

(21) Appl. No.: 15/599,702

(22) Filed: May 19, 2017

(65) Prior Publication Data

US 2017/0256272 A1 Sep. 7, 2017

Related U.S. Application Data

(63) Continuation of application No. PCT/EP2015/068796, filed on Aug. 14, 2015.

(30) Foreign Application Priority Data

Nov. 19, 2014 (DE) .......................... 10 2014 223 566

(51) Int. Cl.
*H04R 25/00* (2006.01)
*G10L 25/78* (2013.01)
(Continued)

(52) U.S. Cl.
CPC .............. *G10L 25/78* (2013.01); *G10L 17/26* (2013.01); *G10L 21/0272* (2013.01);
(Continued)

(58) Field of Classification Search
CPC .... H04R 25/405; H04R 25/407; H04R 25/43; H04R 2460/05
See application file for complete search history.

(56) References Cited

U.S. PATENT DOCUMENTS 6,728,385 B2 * 4/2004 Kvaløy ............... H04R 1/1016
381/317
7,340,231 B2 * 3/2008 Behrens ................. H04R 25/70
381/92

(Continued)

FOREIGN PATENT DOCUMENTS

DE 102011087984 A1 6/2013
EP 2040486 A2 3/2009
(Continued)

*Primary Examiner* — Curtis A Kuntz
*Assistant Examiner* — Ryan Robinson
(74) *Attorney, Agent, or Firm* — Laurence A. Greenberg; Werner H. Stemer; Ralph E. Locher

(57) ABSTRACT

A method for fast recognition of a hearing aid wearer's own voice, and a corresponding apparatus for carrying out the method. The hearing aid receives audio signals from at least two acoustoelectric transducers. The hearing aid has an apparatus with a first filter and a second filter for spatial separation. First filter parameters of the first filter are ascertained and used to attenuate the own voice of the hearing aid wearer of the hearing aid. In addition, second filter parameters of the second filter are ascertained. The second filter parameters are used to attenuate an external audio source. The apparatus is then operated with the first and second parameters, and the wearer's own voice is recognized on the basis of an output signal from the first filter and the second filter.

20 Claims, 2 Drawing Sheets

(51) Int. Cl.
*G10L 17/26* (2013.01)
*G10L 21/0272* (2013.01)

(52) U.S. Cl.
CPC ......... *H04R 25/305* (2013.01); *H04R 25/407* (2013.01); *H04R 25/70* (2013.01)

(56) References Cited

U.S. PATENT DOCUMENTS

| | | | | |
|---|---|---|---|---|
| 7,512,245 | B2 * | 3/2009 | Rasmussen | G10L 25/78 381/122 |
| 7,853,031 | B2 * | 12/2010 | Hamacher | H04R 25/453 381/312 |
| 8,462,969 | B2 * | 6/2013 | Claussen | H04R 25/505 381/317 |
| 8,625,819 | B2 * | 1/2014 | Goldstein | H04R 25/02 381/110 |
| 8,873,779 | B2 | 10/2014 | Lugger | |
| 9,020,160 | B2 * | 4/2015 | Gauger, Jr. | H04R 1/1083 381/71.6 |
| 9,094,766 | B2 | 7/2015 | Merks | |
| 9,210,518 | B2 | 12/2015 | Zhang | |
| 9,219,694 | B2 * | 12/2015 | Banerjee | H04L 47/2441 |
| 9,769,576 | B2 * | 9/2017 | Marquis | H03G 3/344 |
| 9,860,656 | B2 * | 1/2018 | Jensen | H04R 25/407 |
| 2006/0262944 | A1 | 11/2006 | Rasmussen et al. | |
| 2009/0074201 | A1 | 3/2009 | Zhang | |
| 2013/0275128 | A1 | 10/2013 | Claussen et al. | |
| 2014/0088966 | A1 | 3/2014 | Harada et al. | |
| 2015/0230036 | A1 * | 8/2015 | Pedersen | H04R 1/1041 381/330 |
| 2016/0351183 | A1 * | 12/2016 | Gauger, Jr. | H04R 3/002 |
| 2018/0146307 | A1 * | 5/2018 | Petersen | H04R 25/552 |

FOREIGN PATENT DOCUMENTS

| | | |
|---|---|---|
| EP | 2242289 A1 | 10/2010 |
| WO | 2004077090 A1 | 9/2004 |

\* cited by examiner

METHOD AND APPARATUS FOR FAST RECOGNITION OF A HEARING DEVICE USER'S OWN VOICE, AND HEARING AID

CROSS-REFERENCE TO RELATED APPLICATION

This application is a continuation, under 35 U.S.C. § 120, of copending international application PCT/EP2015/068796, filed Aug. 14, 2015, which designated the United States; this application also claims the priority, under 35 U.S.C. § 119, of German patent application DE 10 2014 223 566.9, filed Nov. 19, 2014; the prior applications are herewith incorporated by reference in their entirety.

BACKGROUND OF THE INVENTION

Field of the Invention:

The invention relates to a method for fast recognition of a wearer's own voice for a hearing aid and to a corresponding apparatus. The apparatus receives audio signals from at least two acoustoelectric transducers and has a first filter and a second filter for spatial separation that are connected for signaling purposes to the acoustoelectric transducers.

Hearing aids are portable hearing apparatuses that are used for looking after the hard of hearing. In order to meet the numerous individual needs, different designs of hearing aids are provided, such as behind the ear hearing devices (BTE), hearing devices with an external receiver (RIC: receiver in the canal) and in the ear hearing devices (ITE), e.g. including concha hearing devices or canal hearing devices (ITE, CIC). The hearing devices listed by way of example are worn on the outer ear or in the auditory canal. Furthermore, there are also bone conduction hearing aids, implantable or vibrotactile hearing aids available on the market. These involve the damaged hearing being stimulated either mechanically or electrically.

Hearing aids basically include the primarily important components of an input transducer, an amplifier and an output transducer. The input transducer is normally an acoustoelectric transducer, e.g. a microphone, and/or an electromagnetic receiver, e.g. an induction coil. The output transducer is for the most part implemented as an electroacoustic transducer, e.g. a miniature loudspeaker, or as an electromechanical transducer, e.g. a bone conduction receiver. The amplifier is usually integrated in a signal processing device. Power is usually supplied by a battery or a rechargeable storage battery.

Hearing aids or the ear shells thereof firstly seal the auditory canal completely or partially, and secondly hearing aids preferably pick up airborne sound via their microphone, while body-borne sound is preferably rejected. The voice of the hearing device wearer is perceived differently than from the environment, however, precisely on account of the body-borne sound.

For a hearing device wearer, the fact that primarily airborne sound is amplified results in an altered and unfamiliar perception of the wearer's own voice. In addition, the sealing of the auditory canal by the hearing aid leads to an effect that is termed occlusion and that likewise distorts perception. To process the wearer's own voice and external audio sources differently and to approximate the hearing habits of a person without a hearing aid, it is necessary to recognize the own voice of the hearing device wearer quickly and reliably.

Commonly assigned U.S. Pat. No. 8,873,779 B2 and its counterpart German published patent application DE 10 2011 087 984 A1 discloses a method for recognizing the own voice of the wearer for a hearing aid.

Published patent application US 2006/0262944 A1 discloses a communication apparatus that has a filter and that recognizes the own voice of a wearer.

International patent application publication WO 2004/077090 A1 and U.S. Pat. No. 7,512,245 B2 describe a method for recognizing the own voice of the wearer of a communication device having at least two microphones, wherein in one embodiment the individual microphone signals are each supplied to different filters, the coefficients of which are determined by an optimization method such that the distance of the spectral power density of a voice signal of the wearer from the spectral power density of a representative far field signal is maximized. The microphone signals are each filtered using these coefficients in order to ascertain a near field component in the microphone signals, which is taken as the component of the own voice of the wearer. The use of at least two microphones is necessary in this case in order, when ascertaining the filter coefficients, to be able to use the definition of one of the microphones as a reference microphone to eliminate a dependency on the signal powers, which could lead to corruptions and hence to misjudgments regarding a voice activity of the wearer.

Published patent application US 2014/0088966 A1 proposes ascertaining an own voice activity of a wearer of a communication device on the basis of the differences in the sound pressure, which bring about different sound signals at two microphones of the communication device. The microphones are in this case arranged at such a distance from one another that a voice signal of the wearer has a sufficiently high difference in the sound pressure with which the voice signal strikes the two microphones.

U.S. Pat. No. 9,094,766 B2 and its counterpart European published patent application EP 2 242 289 A1 propose recognizing a voice activity of the wearer in a hearing device having two microphones on the basis of the coefficients of an adaptive filter, wherein an input signal for the adaptive filter is formed by one of the two microphone signals, but wherein the error signal used as reference variable is ascertained on the basis of the other microphone signal by virtue of the compensation signal produced in the adaptive filter being subtracted therefrom. The voice activity is then determined on the basis of normalized magnitudes of the filter coefficients.

U.S. Pat. No. 9,210,518 B2 and its counterpart European published patent application EP 2 040 486 A2 describe the determination of a voice activity of a hearing device wearer on the basis of collation of a fundamental frequency ascertained from two directionally processed microphone signals with one of the two unprocessed microphone signals. Published patent application US 2013/0275128 A1 proposes ascertaining the own voice activity of a wearer of a communication device on the basis of only one microphone signal by means of static methods, this involving a transfer function for the sound path from the mouth of the wearer to the microphone being modeled.

SUMMARY OF THE INVENTION

It is accordingly an object of the invention to provide a method and an apparatus which overcomes the abovementioned and other disadvantages of the heretofore-known devices and methods of this general type and to provide for an apparatus and a method for operating the apparatus, and a hearing aid having such an apparatus, that improve the recognition of the wearer's own voice.

With the foregoing and other objects in view there is provided, in accordance with the invention, a method for fast recognition of the own voice of a hearing aid wearer for a hearing aid, wherein the hearing aid receives audio signals from at least two acoustoelectric transducers and the hearing aid has an apparatus with a first filter and a second filter for spatial separation and the first and second filters are connected for signaling purposes to the acoustoelectric transducers. The novel method comprises:

ascertaining first filter parameters of the first filter, the first filter parameters being configured to attenuate the own voice of the hearing aid wearer;

ascertaining second filter parameters of the second filter, the second filter parameters being configured to attenuate an external audio source;

operating the apparatus and thereby operating the first filter with the first filter parameters and the second filter with the second filter parameters to generate an output signal; and recognizing the wearer's own voice on a basis of the output signal from the first filter and the second filter.

The method according to the invention is a method for fast recognition of the own voice of a hearing aid wearer for a hearing aid. The hearing aid has an apparatus for recognizing the wearer's own voice that receives audio signals from at least two acoustoelectric transducers. Acoustoelectric transducers are usually microphones in the case of hearing aids. In this context, reception of audio signals can be understood to mean that the apparatus according to the invention is directly electrically connected for signaling purposes, in analog or digital form, to the two acoustoelectric transducers, for example when two microphones of a directional microphone system of a hearing aid are involved. However, it is just as conceivable for one of the acoustoelectric transducers to be arranged in a second hearing aid of a binaural hearing aid system or in another separate unit, wherein the audio signal is transmitted from this acoustoelectric transducer to the apparatus wirelessly or in another way.

Additionally, the apparatus has a first filter and a second filter for spatial separation that are connected for signaling purposes to the acoustoelectric transducers. These may be parameterized filters in which, by way of example, the audio signals from the two acoustoelectric transducers are delayed and are added with different weighting by parameters.

In one step of the method according to the invention, first filter parameters of the first filter are ascertained, wherein the first filter parameters are designed to attenuate the own voice of the hearing aid wearer. It is conceivable for these filter parameters to be determined during the actual design of the apparatus or ascertained during later fitting. Alternatively, it is conceivable for, as indicated in one of the dependent claims, the filters to be adaptive and the filter parameters to be ascertained during operation.

The optimal filter coefficients for attenuating the wearer's own voice contain both a magnitude component and a phase component. This means that not only direction is significant, which would suffice in the case of far-field pickup of the signals.

In a further step of the method according to the invention, second filter parameters of the second filter are ascertained, wherein the second filter parameters are designed to attenuate an external audio source. For the type of ascertainment, the statements made above in relation to the first filter parameters apply in the same way.

These coefficients, for the best possible attenuation of external signals, differ both in the magnitude component and in the phase component from the first filter coefficients for attenuating the wearer's own voice.

In one step of the method, the apparatus is operated in a hearing aid, wherein the first filter operates with the first filter parameters and the second filter with the second filter parameters.

In one step of the method, the apparatus recognizes the wearer's own voice on the basis of an output signal from the first filter and the second filter. It is thus conceivable for the wearer's own voice to be recognized when a quotient or a difference or a normalized difference from the output signals from the first filter and the second filter is below or exceeds a predetermined limit value.

With the above and other objects in view there is also provided, in accordance with the invention, an apparatus for fast recognition of an own voice of a hearing aid wearer for a hearing aid. The apparatus is designed to receive audio signals from at least two acoustoelectric transducers. These may be two acoustoelectric transducers that are provided together with the apparatus in the hearing aid and have a direct electrical connection for signaling purposes, in analog or digital form, to the apparatus. However, it is just as conceivable for one of the acoustoelectric transducers to be provided in another unit, for example in a second hearing aid of a binaural hearing aid system, and for an audio signal from the acoustoelectric transducer to be transmittable wirelessly by means of a transmission device.

According to the invention, the apparatus has a first filter and a second filter for spatial separation that are connected for signaling purposes to the acoustoelectric transducers. The first filter is designed to attenuate the own voice of the hearing aid wearer and the second filter is designed to attenuate an external audio source.

The apparatus is additionally designed to recognize the wearer's own voice on the basis of an output signal from the first filter and the second filter. By way of example, the apparatus can have means in order to form a difference, a quotient or a normalized difference for output signals from the first and second filters and a decision unit that recognizes the wearer's own voice when said difference, quotient or normalized difference is below or exceeds a predetermined limit value.

Advantageously, the use of spatial filters allows fast recognition of the wearer's own voice, wherein the interaction of multiple filters simultaneously improves the reliability of the recognition.

In one favorable embodiment, the first filter parameters attenuate the own voice of the hearing aid wearer by virtue of a transfer function being mapped for a sound path from the mouth of the hearing aid wearer to the hearing aid, and the transfer function being used for the attenuation. Attenuation, for which said transfer function is used, allows particularly individual spatial and physiological peculiarities of the hearing device wearer, such as e.g. the head shape or the position of the hearing device when worn, to be taken into consideration. These spatial characteristics of the sound path can best be mapped in this case by ascertaining an applicable transfer function that can then be used to determine the filter parameters. Moreover, such mapping of a transfer function can be implemented really well by technical means, which increases the distinctiveness of the first filter parameters, this being shown particularly in the degree of attenuation of the own voice of the hearing aid wearer in comparison with other audio sources.

In one advantageous embodiment, the second filter parameters attenuate an external audio source by virtue of a transfer function being mapped for a sound path from an external audio source to the hearing aid, and the transfer function being used for the attenuation. Such mapping of a transfer function can be implemented really well by technical means, which increases the distinctiveness of the second filter parameters, this being shown particularly in the degree of attenuation of the external audio source in comparison with other audio sources, particularly the own voice of the hearing aid wearer.

In one favorable embodiment of the method according to the invention, the first filter is an adaptive filter. In particular, the adaptive filter may in this case be implemented by an adaptive algorithm that adaptively determines the first filter coefficients. A first training of the first filter with the own voice of a hearing device wearer as audio source is used to ascertain the first filter parameters, wherein the hearing aid is worn by the hearing device wearer in accordance with the intended use.

An adaptive filter is advantageously capable of adapting itself to suit different constraints. Since the adaptive first filter is trained with the voice of the hearing device wearer, wherein the hearing aid is worn by the hearing device wearer in accordance with the intended use, first filter parameters of the adaptive filter are adapted to suit the geometry and the properties of the head and the apparatus is capable of recognizing the own voice of the hearing device wearer more reliably.

In particular, the first training of the first filter takes place by a process defined by means of a protocol, wherein the process is performed particularly when the hearing device is adjusted by a hearing device acoustician. The protocol particularly comprises certain voice sequences that are particularly suitable for ascertaining the filter parameters. In a likewise advantageous alternative to a defined training process, the first training takes place as part of the general fitting by a hearing device acoustician. The latter can use a suitable interface to transmit additional information to the hearing device e.g. during normal voice activity by the hearing device wearer, so that said hearing device can use the voice activity to ascertain the first filter parameters.

In a additionally advantageous alternative, the hearing device wearer performs the process defined by means of the applicable protocol for the first training independently, wherein particularly by means of a remote control, for example using a remote control provided specifically for the hearing device or using an applicable application on a smartphone of the hearing device wearer, the hearing device is actuated for the individual training phases of the process. In a additionally advantageous configuration, the hearing device wearer performs the first training during his normal voice activity, that is to say particularly without a process exactly defined by a protocol, wherein particularly the additional reference information about voice activity that is present for a training phase of the first training is transmitted via a suitable interface, a remote control provided specifically for the hearing device or via an applicable application on the smartphone of the hearing device wearer. In particular, the hearing device wearer performs multiple different such training phases of the first training in different auditory situations, that is to say, by way of example, at home, outdoors, in conversation situations, in an automobile, etc. Preferably, the respectively ascertained filter parameters in this case are stored as associated with the applicable auditory situation, so that for the method for recognizing a wearer's own voice activity, the set of first filter parameters to be used in the first filter in each case is selected from a superset of different sets of first filter parameters organized according to auditory situations.

In particular, the first training is also performed fully automatically, for example on the basis of a detailed spectral analysis of the audio signals. Such automatic spectral analysis cannot be performed satisfactorily for recognition of the voice itself under runtime conditions. However, the detailed spectral analysis of audio signals can be used to ascertain the first filter parameters, on the basis of which sufficiently reliable recognition becomes possible under runtime conditions.

In one preferred embodiment, the first filter parameters attenuate the own voice of the hearing aid wearer by virtue of the first filter parameters filtering an audio signal from one of the at least two acoustoelectric transducers, and the filtered audio signal being compared with the audio signal from another of the at least two acoustoelectric transducers. In this way, it is particularly possible to draw conclusions about the sound path to be mapped from differences in the phase angle in the respective audio signals from the at least two acoustoelectric transducers. A comparable approach is also advantageous for the second filter parameters.

Advantageously, ascertainment of the first filter parameters in this case involves those parameter values being used that minimize a difference signal from the filtered audio signal and the audio signal from the further acoustoelectric transducer. It is now possible to use an audio signal from one of the acoustoelectric transducers as a reference signal, and to adapt the first filter parameters that are applied to the audio signal from the other of the acoustoelectric transducers until the two audio signals are approximately identical, and the difference signal is therefore at a minimum.

In this case, the first filter parameters modify the audio signal from the applicable acoustoelectric transducer such that this maps the sound path from the audio source, which in this case is formed by the mouth of the hearing device wearer, to the respective other acoustoelectric transducer, wherein peculiarities in the frequency response of the own voice of the hearing device wearer, for example caused by particular characteristic features of the voice or perhaps the pronunciation, are also used in this mapping, particularly for sound propagation.

A comparable approach is also advantageous for ascertainment of the second filter parameters by means of an external audio source. In this case, it is moreover possible to map the sound path from an external audio source at the presumedly usual position of an interlocutor in a conversation situation.

In one expedient embodiment of the method according to the invention, the second filter is an adaptive filter. In particular, the adaptive filter may in this case be implemented by an adaptive algorithm that adaptively determines the second filter coefficients. A second training of the second filter with an external audio source at a predetermined relative position in relation to the hearing aid is used to ascertain the second filter parameters.

An adaptive filter is advantageously capable of adapting itself to suit different constraints. Since the adaptive second filter is trained with an external audio source at a predetermined relative position, the second filter is better able to filter or reject a sound source at the relative position. It is particularly conceivable for the training to be effected with the hearing aid worn by the hearing device wearer in accordance with the intended use, so that the second filter is advantageously also adapted to suit the individual acoustic properties of the head of the hearing device wearer.

In particular, the second training of the second filter takes place by a process defined by means of a protocol, wherein the process is performed particularly when the hearing device is adjusted by a hearing device acoustician. The protocol particularly comprises certain sequences that the hearing device acoustician speaks which are particularly suitable for ascertaining the filter parameters. In a likewise advantageous alternative to a defined training process, the second training takes place as part of the general fitting by the hearing device acoustician. The latter can use a suitable interface, e.g. during his normal voice activity, to transmit additional information to the hearing device, so that the latter can use the voice activity to ascertain the second filter parameters.

In a additionally advantageous alternative, the hearing device wearer performs the process defined by means of the applicable protocol for the second training independently, wherein particularly by means of a remote control, for example using a remote control provided specifically for the hearing device or using an applicable application on a smartphone of the hearing device wearer, the hearing device is actuated for the individual training phases of the process. In this case, the external audio source is preferably provided by the smartphone running with the applicable application. In a additionally advantageous configuration, the hearing device wearer performs the second training during normal conversation situations, that is to say particularly without a process exactly defined by a protocol, wherein particularly the additional reference information about voice activity that is present for a training phase of the second training is transmitted via a suitable interface, a remote control provided specifically for the hearing device or via an applicable application on the smartphone of the hearing device wearer. In particular, the hearing device wearer performs multiple different such training phases of the second training in different auditory situations. Preferably, the respectively ascertained filter parameters in this case are stored as associated with the applicable auditory situation, so that for the method for recognizing a wearer's own voice activity, the set of second filter parameters to be used in the second filter in each case is selected from a superset of different sets of second filter parameters organized according to auditory situations.

In particular, the second training is also performed fully automatically, for example on the basis of a detailed spectral analysis of the audio signals. Such automatic spectral analysis cannot be performed satisfactorily for recognition of the voice itself under runtime conditions. However, the detailed spectral analysis of audio signals can be used to ascertain the second filter parameters, on the basis of which sufficiently reliable recognition becomes possible under runtime conditions.

In a additionally advantageous embodiment of the method according to the invention, the recognition of the wearer's own voice is effected on the basis of a ratio of amplitudes of the output signals from the first filter and the second filter.

Advantageously, the use of two different signals increases the reliability of the recognition of the wearer's own voice. By virtue of the ratio of the amplitudes being used, normalization to an ambient noise level takes place, which allows recognition both under loud conditions and under quiet conditions.

In accordance with an added feature of the invention, the method is carried out only in a subset of a plurality of disjunct, or only partially overlapping, frequency ranges of the audio signals. Advantageously, the recognition of the wearer's own voice is easier in particular frequency ranges that are obtained as a result of the voice frequencies and as a result of acoustic properties of the head. If the method according to the invention is carried out in one or more predetermined frequency band element(s) of the acoustic spectrum, therefore, it is possible both for recognition certainty to be improved and for the required computation power to be reduced in comparison with use in all frequency band elements.

In accordance with a particularly expedient embodiment of the method, the output signal from the first filter is formed by a difference signal from an audio signal from one of the at least two acoustoelectric transducers, which audio signal is filtered with the first filter parameters, and an audio signal from another of the at least two acoustoelectric transducers, wherein the output signal from the second filter is formed by a difference signal from an audio signal from one of the at least two acoustoelectric transducers, which audio signal is filtered with the second filter parameters, and an audio signal from another of the at least two acoustoelectric transducers. This allows a respective attenuation of a signal that comes from an unknown audio source to be compared by the two filters particularly easily.

In a additionally preferred embodiment of the method according to the invention, the second filter most heavily attenuates signals from an audio source that is arranged in front of the wearer of the hearing aid when it is worn in accordance with the intended use.

Advantageously, an interlocutor is usually located in front of the speaker or listener in the direction of view. Since the second filter attenuates signals in this direction, the change between the wearer's own speech and speech of the interlocutor in the direction of view can be recognized particularly reliably during a conversation.

In an additionally favorable embodiment of the method according to the invention, the apparatus has a plurality of second filters that each most heavily attenuate signals from an audio source at different relative positions in relation to the hearing aid.

Hence, in the method according to the invention, it is also possible to distinguish audio sources in different directions and advantageously also to reliably recognize the wearer's own voice in a conversation with multiple interlocutors.

In an additionally expedient embodiment of the method according to the invention, said method additionally has the step of reducing background noise in signals from the first and the second acoustoelectric transducer before they are supplied to the first filter and the second filter.

Since background noise is reduced in the signals from the first and second acoustoelectric transducers, the first and second filters can better isolate a source in the near field and a source in the far field and thus further improve the reliability of the recognition of the wearer's own voice.

Other features which are considered as characteristic for the invention are set forth in the appended claims. The dependent claims pertaining to the apparatus according to the invention share the advantages of the corresponding method claims.

Although the invention is illustrated and described herein as embodied in a method and apparatus for fast recognition of a user's own voice, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following

DETAILED DESCRIPTION OF THE INVENTION

Figure 1:
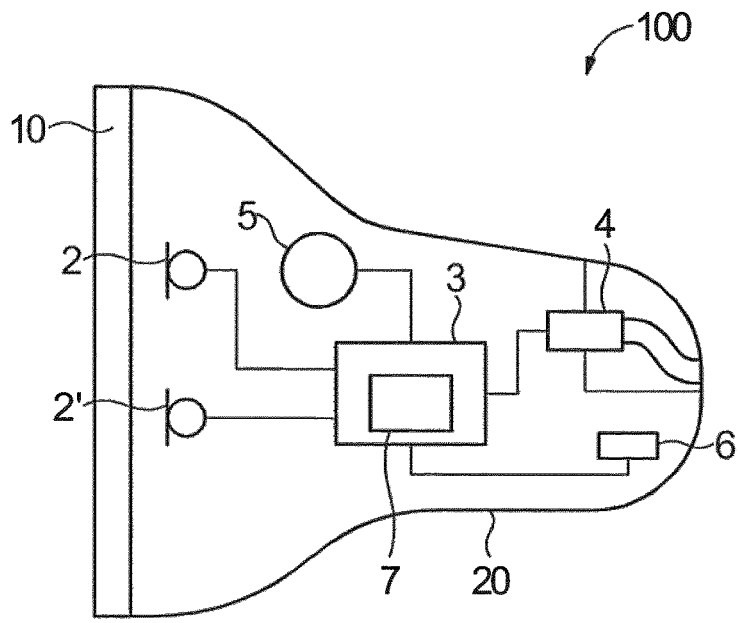
FIG. 1 shows an exemplary schematic depiction of a hearing aid according to the invention.

Referring now to the figures of the drawing in detail and first, particularly, to FIG. 1 thereof, there is shown a basic design of a hearing aid 100 according to the invention. A hearing aid housing 10, 20 incorporates one or more microphones, also referred to as acoustoelectric transducers 2, 2', for picking up the sound or audible signals from the environment. The hearing aid may, in principle, be a behind the ear (BTE) or in the ear (ITE) device. The microphones 2, 2' are acoustoelectric transducers 2, 2' for converting the sound into first electrical audio signals. A signal processing device 3, which is likewise arranged in the hearing aid housing 10, 20, processes the first audio signals. The output signal from the signal processing device 3 is transmitted to a loudspeaker or receiver 4 that outputs an audible signal. In the case of a BTE hearing aid, the sound is transmitted to the eardrum of the device wearer, possibly via a sound tube that is fixed in the auditory canal with an ear mold. Alternatively, another electromechanical transducer is conceivable, such as a bone conduction receiver, for example. The power supply for the hearing aid 100 and particularly for the signal processing device 3 is provided by a battery 5 that is likewise integrated in the hearing aid housing 10, 20.

The hearing aid 100 additionally has an apparatus 7 for recognizing the own voice of the hearing device wearer. The apparatus 7 for recognizing the own voice of the hearing device wearer may be embodied as a separate unit and at the same time obtain first audio signals from multiple acoustoelectric transducers 2, 2' via a signal connection from the signal processing device 3.

In the depicted embodiment of the hearing aid according to the invention, the apparatus 7 for recognizing the wearer's own voice is implemented in the signal processing device 3, however, as a separate circuit or as executed program instructions.

In one preferred embodiment of the apparatus 7 according to the invention, the apparatus 7 for recognizing the own voice of the hearing device wearer is capable of recognizing the voice in a short time, that is to say within the period of a single sound or even faster, for example within less than 100 ms or 50 ms. This is only possible when the hearing aid uses particularly quickly recognizable properties of the voice.

In this case, the apparatus 7 according to the invention uses the direction of the sound source and/or a symmetry. As such, audio signals from multiple acoustoelectric transducers 2, 2' and first and second filters are used to produce output signals from the filters that have different directivity. To this end, the first and/or the second filter can delay the respective input signals, for example, and sum them with a different weighting for each different delay time. The individual weightings are in this case filter parameters of the respective filter.

In this case, it is conceivable for both acoustoelectric transducers 2, 2' to be arranged at a distance from one another in a hearing aid 100. However, it is just as conceivable for the hearing aid 100 to be part of a binaural hearing aid system comprising two hearing aids 100. The hearing aid 100 then has a wireless signal transmission device 6 that it uses to receive from the respective other hearing aid an audio signal from an acoustoelectric transducer 2 and forward it to the apparatus 7. In this way, the two acoustoelectric transducers 2, 2' are arranged far apart symmetrically with respect to the head of a hearing device wearer, which facilitates direction determination for low frequency sound waves having wavelengths in the range of several centimeters, for example between 1 and 10 cm. In this case too, the mouth as the source of the wearer's own voice is arranged symmetrically with respect to the two acoustoelectric transducers 2, 2'.

In one embodiment, the first filter with first filter parameters is designed to attenuate an audio source at close range to the hearing aid 100. In this case, it is conceivable for these filter parameters to be determined by model calculations during the actual design of the apparatus 7 or to be ascertained in a measurement space using signal sources during a later fitting.

The optimum filter coefficients for attenuating the wearer's own voice contain both a magnitude component and a phase component. This means that not only direction is significant, which would suffice in the case of far-field pickup of the signals.

In one embodiment, the second filter with the second filter parameters is designed to attenuate an audio source in a far field of the hearing aid.

These coefficients, for the best possible attenuation of external signals, differ both in the magnitude component and in the phase component from the first filter coefficients for attenuating the wearer's own voice.

The own voice of the hearing device wearer is recognized by the apparatus 7 on the basis of the two output signals from the first filter and the second filter. As such, it is possible to recognize the wearer's own voice when the difference or a quotient for the two output signals is below or exceeds a predetermined value. If, by way of example, the initial value of the output levels of the second filter is greater than that for the first filter, that is to say the signal level in the near field exceeds that in the far field, then recognition of the wearer's own voice can be inferred if the quotient of the signal levels of the second filtered divided by the signal level of the first filter exceeds a predetermined value. The same applies if the difference for the signal level of the second filter minus the signal level of the first filter exceeds a predetermined value.

In one embodiment, it is also conceivable for the difference between the two output amplitudes to be divided by the output level of the second filter. In this case, as already beforehand during quotient formation, the signal is normalized in relation to the ambient noise, which hampers recognition in a loud environment, for example, and allows the apparatus 7 to allow for such a situation.

In possible embodiments, the first and/or the second filter are adaptive filters. By means of an NMLS algorithm, for example, adaptive filters are capable of adapting their parameters such that for a prescribed input signal the output signal receives a maximum value and a minimum value. As such, it is advantageously possible to train the first filter on the head of a hearing device wearer or in a test environment to attenuate a signal from the wearer's own voice as heavily as possible. In the same way, it is possible to train the second filter to reject a signal from an audio source in a predetermined position, for example in the direction of view of the hearing device wearer when the hearing device 100 with the apparatus 7 is worn on the head, as heavily as possible. The training renders the filters capable of also allowing for properties of the head of the hearing device wearer. Training can take place during fitting, for example, or perhaps in the familiar environment of the hearing device wearer (preferably for the first filter). The apparatus 7 is subsequently operated with the ascertained first and second filter parameters for the first and/or second adaptive filter, in order to improve recognition.

Additionally, it is possible for multiple second filters having predetermined or preferably adaptive filters to be provided in order to allow recognition of the wearer's own voice even in situations with multiple speakers.

The signal processing device 3 can also split the signals from the acoustoelectric transducers 2, 2' into a plurality of disjunct or only partially overlapping frequency ranges by means of filter bank or Fourier transformation. Advantageously, the apparatus 7 then recognizes the wearer's own voice only in a subset of the frequency ranges, i.e. the method according to the invention is carried out only in this subset in the multiple frequency ranges in order to save processor resources. Preferably, this is accomplished by selecting frequency ranges that, on account of the frequencies that occur in the voice and the propagation properties close to the head, are particularly suitable for distinguishing between the own voice of the hearing device wearer and another voice.

The apparatus 7 has a particularly high level of reliability for recognizing the wearer's own voice if noise in front of the apparatus 7 itself is removed from the audio signals from the acoustoelectric transducers 2, 2', or at least reduced. In one embodiment of the apparatus 7 according to the invention, a further filter is therefore provided. This filter may likewise be provided in the signal processing device 3 and can reduce noise by way of an adaptive filter, for example.

Figure 2:
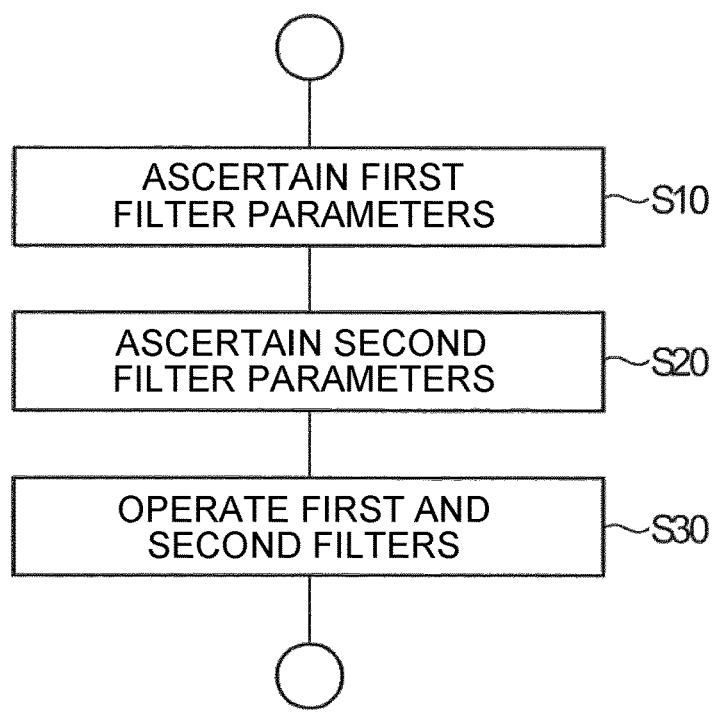
FIG. 2 shows a schematic flowchart for an embodiment of the method according to the invention.

A schematic flowchart for an exemplary embodiment of the method according to the invention is depicted in FIG. 2.

In a step S10, first filter parameters of the first filter are ascertained, the first filter parameters being designed to attenuate an audio source in an area close to the hearing aid. Step S10 can take place during the actual design of the apparatus 7, for example. Alternatively, it is conceivable for step 10 to take place when a hearing aid 100 having an apparatus 7 is fitted. In this case, step S10 can take place by means of training with the wearer's own voice if the first filter is an adaptive filter.

In a step S20, second filter parameters of the second filter are ascertained, the second filter parameters being designed to attenuate an audio source in a far field for the hearing aid. Step S20 can take place during the actual design of the apparatus 7, for example. However, as in the case of step S10, it is conceivable for step S20 to take place when a hearing aid 100 having an apparatus 7 is fitted. In this case, step S20 can take place by means of training with one or more audio signal sources at a predetermined relative position in relation to the acoustoelectric transducers 2 if the second filter is an adaptive filter.

In a step S30, the apparatus 7 is operated, preferably in a hearing aid 100, wherein the first filter operates with the first filter parameters and the second filter with the second filter parameters.

In a step S30, the own voice of the hearing device wearer of the hearing aid 100 having the apparatus 7 is recognized on the basis of an output signal from the first filter and the second filter. Various exemplary options for how this can take place are already specified in relation to FIG. 1.

Figure 3:
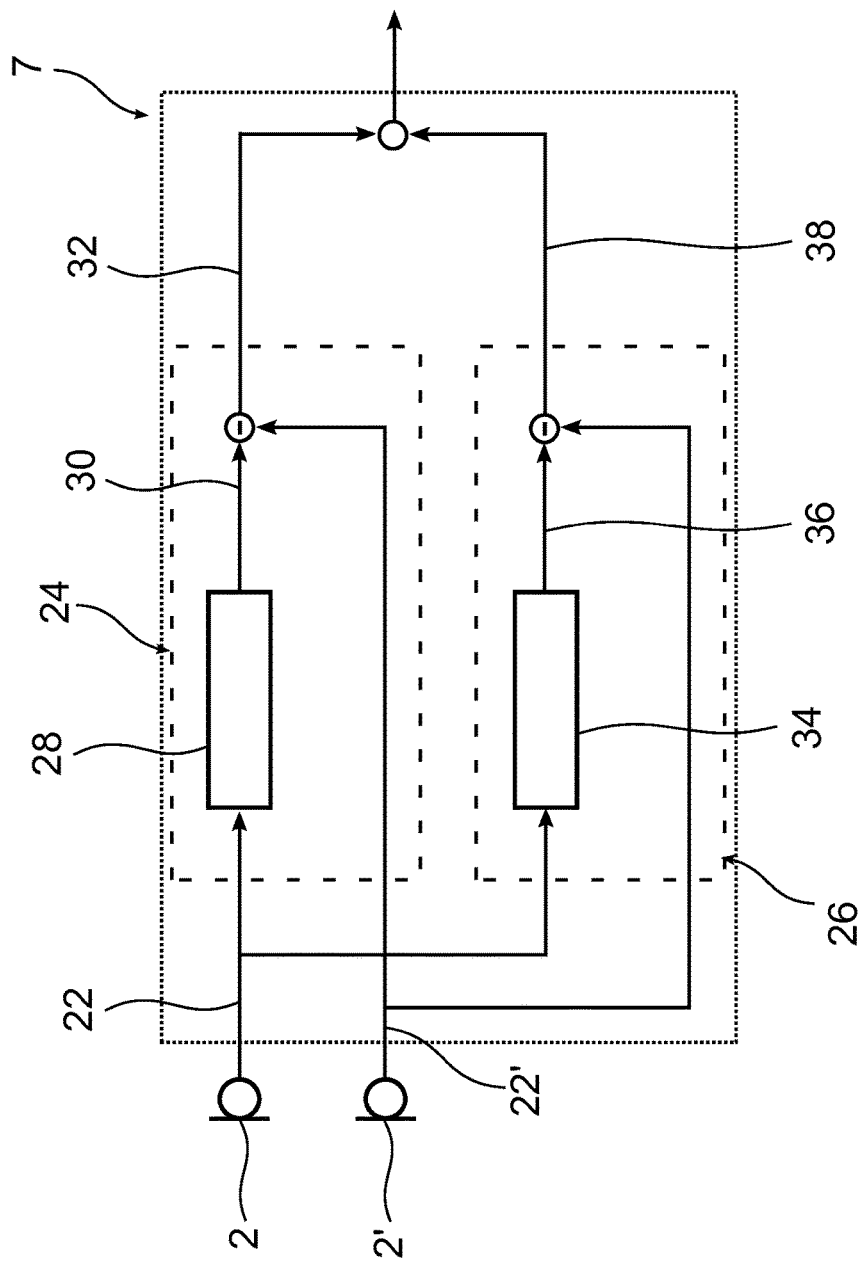
FIG. 3 shows an apparatus for recognizing the own voice of the hearing device wearer.

FIG. 3 uses a block diagram to schematically depict an apparatus 7 for recognizing the own voice of the hearing device wearer. In this case, the apparatus 7 receives audio signals 22, 22' from the acoustoelectric transducers 2, 2'. The audio signals 22, 22' are furthermore transmitted to the signal processing device for signal processing in a manner that is not depicted in more detail. The two audio signals 22, 22' are then each supplied to a first filter 24 and a second filter 26. In the first filter 24, first filter parameters 28 are applied to the audio signal 22 from the acoustoelectric transducer 2, and subsequently a difference signal 32 is formed from the audio signal 30 filtered using the first filter parameters 28 and the audio signal 22' from the acoustoelectric transducer 2'. In the second filter 26, second filter parameters 34 are applied to the audio signal 22 from the acoustoelectric transducer 2, and subsequently a difference signal 38 is formed from the audio signal 36 filtered using the second filter parameters 34 and the audio signal 22' from the acoustoelectric transducer 2'. The application of the first filter parameters 28 and the second filter parameters 34 to the audio signal 22 in this case may be implemented as an FIR filter in each instance, for example.

The difference signal 32 now forms the output signal from the first filter 24, and the difference signal 38 forms the output signal from the second filter 26. The amplitudes of the two output signals 32, 38 from the first filter 24 and the second filter 26 are then compared with one another. The first filter parameters 28 have in this case been adjusted in a training process such that the filtered audio signal 30 maps the sound path from the mouth of the hearing device wearer to the hearing device as exactly as possible, and in so doing can also allow for spectral peculiarities of the voice of the hearing device wearer and resultant absorptions by his head. The second filter parameters 34 have been adjusted in a comparable training process such that the filtered audio signal 36 maps the sound path from an external audio source to the hearing device as exactly as possible, the presupposed position of the external audio source for this purpose being able to be a standard position of an interlocutor in a conversation situation.

A comparison of the amplitudes of the output signals 32, 38 from the first filter 24 and the second filter 26 now allows a decision to be made as to whether or not the audio signals 22, 22' produced by the acoustoelectric transducers 2, 2' come from the own voice of the hearing device wearer. In the first case, the applicable adjustment of the first filter parameters 28 means that the output signal 32 from the first filter 24 has a small amplitude, whereas the output signal 38 from the second filter 26, since accordingly the second filter parameters 34 map a totally different sound path, has no obvious attenuation. The apparatus 7 can therefore decide that there is voice activity by the hearing device wearer.

Conversely, audio signals 22, 22' brought about by an external audio source are still sufficiently attenuated by the second filter 26 even if the position of the external audio source does not correspond to that position of the reference audio source used for ascertaining the second filter parameters 34. In particular, much heavier attenuation of such audio signals can be expected from the second filter 26 than from the first filter 24, since this involves allowance being made particularly also for the different phase angles of the sound on the respective sound path that are used in the first filter parameters 28 and the second filter parameters 34. In particular, it is also possible for the audio signal 22' to be filtered in the second filter using the second filter parameters 34 in this case, so that the formation of the difference signal 36 involves use of the audio signal 22 from the acoustoelectric transducer 2 in unaltered form, that is to say particularly in unfiltered form.

Although the invention has been illustrated and described in more detail by means of the preferred exemplary embodiment, the invention is not limited by the disclosed examples and other variations can be derived therefrom by a person skilled in the art without departing from the scope of protection of the invention.

The invention claimed is:

1. A method for fast recognition of the own voice of a hearing aid wearer for a hearing aid, wherein the hearing aid receives audio signals from at least two acoustoelectric transducers and the hearing aid has an apparatus with a first filter and a second filter for spatial separation and the first and second filters are connected for signaling purposes to the acoustoelectric transducers, the method comprising:
   ascertaining first filter parameters of the first filter, the first filter parameters being configured to attenuate the own voice of the hearing aid wearer;
   ascertaining second filter parameters of the second filter, the second filter parameters being configured to attenuate an external audio source;
   operating the apparatus and thereby operating the first filter with the first filter parameters and the second filter with the second filter parameters to generate an output signal; and
   recognizing the wearer's own voice on a basis of the output signal from the first filter and the second filter.

2. The method according to claim 1, wherein the first filter parameters attenuate the own voice of the hearing aid wearer by a transfer function that is mapped for a sound path from a mouth of the hearing aid wearer to the hearing aid, and wherein the transfer function is used for the attenuation.

3. The method according to claim 1, wherein the second filter parameters attenuate an external audio source by a transfer function that is mapped for a sound path from an external audio source to the hearing aid, and wherein the transfer function is used for the attenuation.

4. The method according to claim 1, wherein the first filter is an adaptive filter and the method comprises using a first training of the first filter with the own voice of the hearing aid wearer to ascertain the first filter parameters, while the hearing aid is worn by the hearing aid wearer in accordance with an intended use of the hearing device.

5. The method according to claim 4, which comprises causing the first filter parameters to attenuate the own voice of the hearing aid wearer by filtering an audio signal from one of the at least two acoustoelectric transducers with the first filter parameters to generate a filtered audio signal, and comparing the filtered audio signal with an audio signal from another of the at least two acoustoelectric transducers.

6. The method according to claim 5, wherein the step of ascertaining the first filter parameters comprises using those parameter values that minimize a difference signal from the filtered audio signal and the audio signal from the other of the at least two acoustoelectric transducers.

7. The method according to claim 1, wherein the second filter is an adaptive filter and the method comprises using a second training of the second filter with an external audio source at a predetermined relative position in relation to the hearing aid to ascertain the second filter parameters.

8. The method according to claim 7, which comprises causing the second filter parameters to attenuate an external audio source by filtering an audio signal from one of the at least two acoustoelectric transducers with the second filter parameters to generate a filtered audio signal, and comparing the filtered audio signal with the audio signal from another of the at least two acoustoelectric transducers.

9. The method according to claim 8, wherein the step of ascertaining the second filter parameters comprises using those parameter values that minimize a difference signal from the filtered audio signal and the audio signal from the other of the at least two acoustoelectric transducer.

10. The method according to claim 1, wherein the step of recognizing the wearer's own voice comprises determining a ratio of amplitudes of the output signals from the first filter and the second filter.

11. The method according to claim 10, which comprises:
   forming the output signal from the first filter by a difference signal from an audio signal from one of the at least two acoustoelectric transducers, which audio signal is filtered with the first filter parameters, and an audio signal from another of the at least two acoustoelectric transducers; and
   forming the output signal from the second filter by a difference signal from an audio signal from one of the at least two acoustoelectric transducers, which audio signal is filtered with the second filter parameters, and an audio signal from another of the at least two acoustoelectric transducers.

12. The method according to claim 1, which comprises carrying out the method only in a subset of a plurality of disjunct or only partially overlapping frequency ranges of the audio signals.

13. The method according to claim 1, which comprises most heavily attenuating with the second filter signals from an audio source that is arranged in front of the wearer of the hearing aid when the hearing aid is worn in accordance with the intended use.

14. The method according to claim 1, wherein the apparatus has a plurality of second filters and the method comprises using each of the second filters to most heavily attenuate signals from an audio source at different relative positions in relation to the hearing aid.

15. The method according to claim 1, which further comprises a step of reducing background noise in signals from the first and second acoustoelectric transducers before the signals are supplied to the first filter and the second filter, respectively.

16. An apparatus for fast recognition of an own voice of a hearing aid wearer for a hearing aid, wherein the hearing aid is configured to receive audio signals from at least two acoustoelectric transducers, the apparatus comprising:
   a first filter and a second filter for spatial separation that are connected for signaling purposes to the at least two acoustoelectric transducers;
   wherein said first filter is configured to attenuate the own voice of the hearing aid wearer and to issue an output signal, and said second filter is configured to attenuate an external audio source and to issue an output signal; and
   wherein the apparatus is configured to recognize the wearer's own voice on a basis of the output signal from the first filter and the second filter.

17. The apparatus according to claim 16, wherein said first filter is an adaptive filter having first filter parameters that filter an audio signal from one of the at least two acoustoelectric transducers, and wherein a difference signal is formed from the audio signal filtered with the first filter parameters and the audio signal from another of the at least two acoustoelectric transducers as an output signal from said first filter.

18. The apparatus according to claim 16, wherein said second filter is an adaptive filter having second filter parameters that filter an audio signal from one of the at least two acoustoelectric transducers, and wherein a difference signal is formed from the audio signal filtered with the second filter parameters and the audio signal from another of the at least two acoustoelectric transducers as an output signal from said second filter.

19. A hearing aid, comprising an apparatus according to claim 16 for fast recognition of an own voice of a hearing aid wearer.

20. A method for fast recognition of the own voice of a hearing aid wearer for a hearing aid, comprising the steps of:
  providing a hearing aid that receives audio signals from at least two acoustoelectric transducers, the hearing aid having an apparatus with a first filter and a second filter for spatial separation, wherein each of the first filter and the second filter are connected for signaling purposes to all of the acoustoelectric transducers;
  ascertaining first filter parameters of the first filter, the first filter parameters being configured to attenuate the own voice of the hearing aid wearer;
  ascertaining second filter parameters of the second filter, the second filter parameters being configured to attenuate an external audio source;
  operating the apparatus and thereby operating the first filter with the first filter parameters and the second filter with the second filter parameters to generate an output signal; and
  recognizing the wearer's own voice on a basis of the output signal from the first filter and the second filter.

* * * * *